United States Patent Office 3,253,001
Patented May 24, 1966

3,253,001
ANTHRAQUINONE DYE DEVELOPERS
Milton Green, Newton Center, and Howard G. Rogers, Weston, Mass., assignors to Polaroid Corporation, Cambridge, Mass., a corporation of Delaware
No Drawing. Filed Dec. 1, 1964, Ser. No. 415,170
6 Claims. (Cl. 260—378)

This application is a continuation-in-part of application Serial No. 93,308, filed March 8, 1961, and now abandoned.

This invention relates to novel chemical compounds and, more particularly, to a novel class of anthraquinone dye developers (dyes which are also silver halide developing agents).

U.S. Patent No. 2,983,606, issued to Howard G. Rogers, describes and claims photographic products, processes and compositions for preparing color images involving the utilization of dyes which are also silver halide developing agents, designated as "dye developers."

A primary object of this invention is to provide a novel class of compounds useful in photographic products, processes and compositions such as described and claimed in the aforementioned U.S. Patent No. 2,983,606.

Another object is to provide a novel class of anthraquinone dyes which are also silver halide developing agents.

Other objects of the invention will in part be obvious and will in part appear hereinafter.

The invention accordingly comprises the processes involving the several steps and the relation and order of one or more of such steps with respect to each of the others and the products possessing the features, properties and the relation of components which are exemplified in the following detailed disclosure, and the scope of the application of which will be indicated in the claims.

The novel dye developers of this invention are anthraquinone dyes of the formula:

(A)         A—(NH—Z—S—X)$_m$ wherein A is an anthraquinone nucleus, X is a dihydroxyphenyl silver halide developing radical, e.g., an ortho- or para-dihydroxyphenyl radical or an alkyl substituted derivative thereof; Z is an alkylene, arylene or alkarylene group, and $m$ is a positive integer of 1 to 2. Each —(NH—Z—S—X) substituent is preferably bonded to an alpha carbon atom of the anthraquinone nucleus, e.g., in the 1 and/or 4 position.

It should be understood that, when desired, A may be substituted by one or more of several groups such as amino, alkyl, aryl, halogen, alkylamino, especially hydroxy alkylamino, and hydroxy-sec-alkylamino, aryloxy, alkoxy, hydroxyl, sulfonamido, alkylsulfonamido, arylsulfonamido, carboxamido, carboxyl or sulfo radicals. The presence or absence of such additional substituents is immaterial for purposes of this invention, since the essence of the invention is the presence on an anthraquinone dye nucleus of the designated substituent containing a silver halide developing radical.

One class of dye developers within the scope of this invention which has been found particularly useful is that wherein $m$ is 2 and the —NH—Z—S—X radicals are substituted in the 1 and 4 positions. Such dye developers may be represented by the formula:

(B)
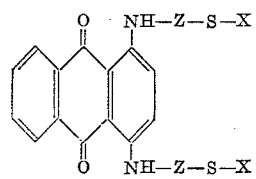

wherein Z and X are the same as above, it being expressly understood that the anthraquinone nucleus may contain other substituents, as noted previously.

Another class of dye developers within the scope of this invention which has been found particularly useful is that wherein $m$ is 1, the —NH—Z—S—X radical is substituted in the 4 position and the 1 position is substituted by an alkylamino group, preferably a hydroxy-alkylamino group and more preferably a hydroxy-sec-alkylamino group, e.g.,

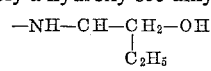

Although the length of such alkyl groups may be varied, especially useful results have been obtained when said alkyl group comprises less than 6 carbon atoms. The dye developer within this class may be represented by the formula:

(C)
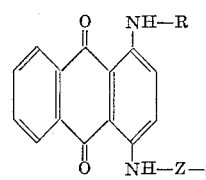

wherein Z and X are the same as above and R is an alkyl, preferably a hydroxyalkyl and more preferably a hydroxy-sec-alkyl group. As was mentioned previously with regard to Formula B, it is to be expressly understood that the anthraquinone nucleus may contain other substituents.

As examples of alkylene radicals comprehended by the radical Z, mention may be made of radicals such as

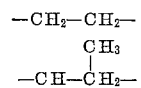

and

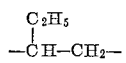

It is also intended that Z may be a substituted alkylene radical such as, for example, a hydroxyalkylene radical. As other examples of radicals comprehended by the radical Z, mention may be made of arylene radicals, such as phenylene, or alkarylene radicals such as

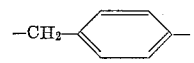

etc.

The 1 and 4 substituted anthraquinones such as those represented by Formulae B and C may be conveniently prepared from 1,4-diaminoanthraquinone and 1,4-dihydroxyanthraquinones, i.e., quinizarins. When quinizarin is used in the preparation of the compounds herein disclosed, the quinizarin is preferably reduced to leuco quinizarin, then condensed and the resulting product oxidized to the anthraquinone by, for example, aerial oxidation. When the dye developers within this invention are produced directly from quinizarin the reaction is preferably carried out in the presence of phenols.

The dye developers within Formula C may be prepared by condensing an anthraquinone such as quinizarin with about an equivalent of an amine within the formula:

(D)
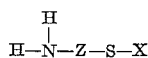

and then with about an equivalent of an amine within the formula:

(E)            $NH_2$—R wherein Z, X and R are the same as above. It will be understood that the order of condensing the amines may be reversed to suit particular needs.

Compounds within Formula B may be prepared by condensing 1 mole of an anthraquinone such as quinizarin with 2 moles of an amine within Formula D. It will be further understood that dye developers within Formula B wherein the —NH—Z—S—X radicals are different may be similarly prepared by using two different amines of the Formula D.

Compounds within the scope of Formula D wherein Z is arylene or alkarylene are described and claimed in U.S. Patents No. 3,009,958 and 3,043,690, issued to Milton Green and Howard G. Rogers.

The dye developers of this invention may also be prepared by condensing an anthraquinone of the formula:

(F)     A—(NH—Z—Y)$_m$ wherein Y is halogen, e.g., bromine, with a mercapto-substituted dihydroxyphenyl silver halide developing radical. For example, one mole of a 1,4-bis-(haloalkylamino)-anthraquinone may be condensed with two moles of a mercapto-substituted ortho- or para-dihydroxybenzene to form a dye developer of Formula B.

Still another method is by condensing one mole of a 1,4-bis-(mercaptoalkylamino)-anthraquinone with two moles of a quinone, such as toluquinone.

Although X has been defined as an ortho- or para-dihydroxyphenyl radical, it should be understood that in certain instances one may desire to use other silver halide developing radicals to provide the silver halide developing function in the dye developer, for example, a dihydroxy-substituted naphthyl radical. It should also be understood that the radical X may contain substituents other than those which supply the silver halide developing ability; such substituents include alkyl as heretofore mentioned, alkoxy, hydroxy, halogen, etc., groups.

During synthesis, it may be desirable to protect the hydroxyl groups, which supply the developing function possessed by X, by acylation, for example, to avoid side reactions or oxidation. The protective groups are removed, as by hydrolysis, prior to photographic use.

As examples of dye developers within the scope of this invention, mention may be made of:

(1) 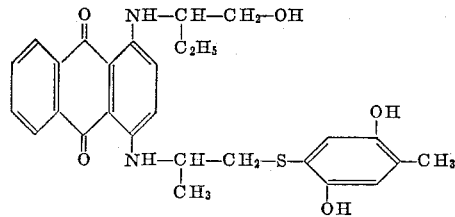

(2) 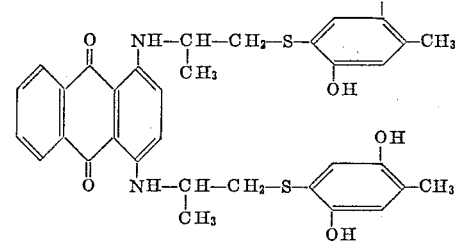

(3) 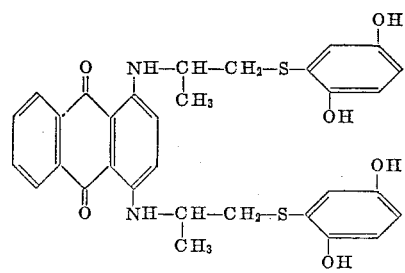

(4) 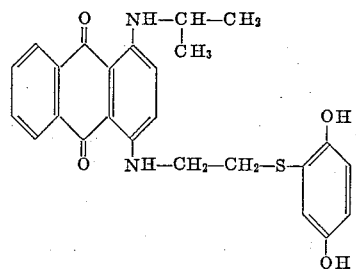

(5) 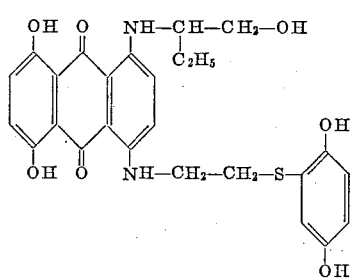

(6) 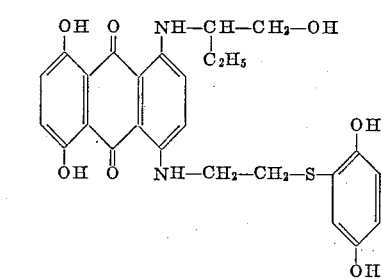

(7) 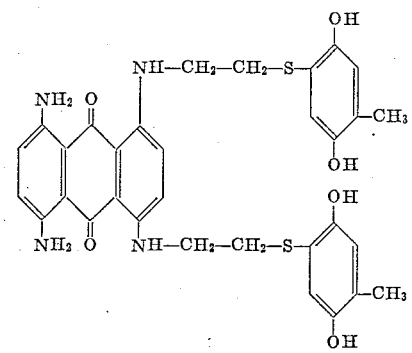

(8) 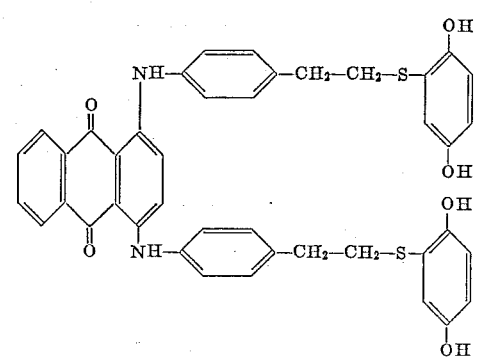

(9) 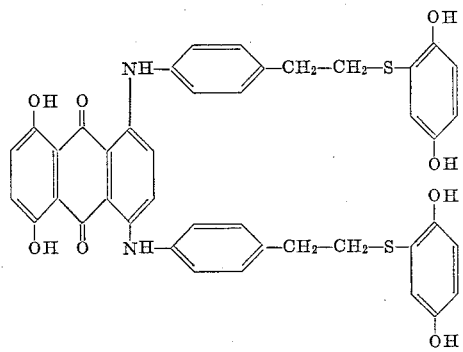

(10) 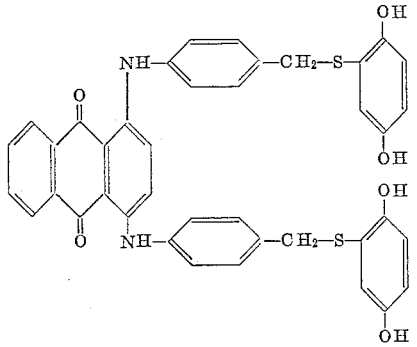

(11) 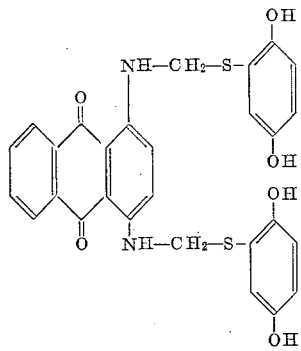

(12) 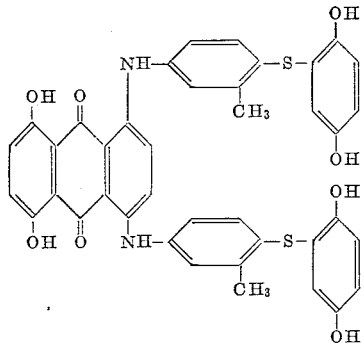

The following nonlimiting examples illustrate the preparation of dye developers within the scope of this invention.

*Example 1*

36.0 g. quinizarin (0.15 mole), and 50 g. phenol were added to 180 ml. of ethanol and 120 ml. of water and de-aerated with nitrogen. 5 g. of sodium carbonate, 74.4 g. of 2-aminopropylthiohydroquinone-hydrobromide (0.30 mole), and 25.2 g. of sodium bicarbonate were then added and refluxing under nitrogen was carried out for 22 hours until the reaction was completed. The reaction mixture was poured into 10% hydrochloric acid yielding a gummy mass. The gummy mass was purified by twice dissolving in acetone and precipitating into dilute hydrochloric acid and then precipitating from ethyleneglycol monoethyl ether solution into dilute hydrochloric acid. The mass was further purified twice by precipitation from ethyl acetate solution into hexane and drying in a vacuum desiccator. The resulting product was 1,4-bis-[β-(p-hydroquinonylthio) - α - methylethylamino] - anthraquinone [Formula 3].

*Example 2*

1 - (α - ethyl - β - hydroxyethylamino) - 4 -[β - (p-toluhydroquinonylthio) - α - methylethylamino] - anthraquinone [Formula 1] was prepared by reacting leuco quinizarin (0.05 mole) with α-ethyl-β-hydroxyethylamine (0.05 mole) in the presence of sodium bicarbonate (0.05 mole) at reflux for 30 minutes under nitrogen. To this was added (0.05 mole) β-(p-toluhydroquinonylthio)-α-methylethylamine, 150 ml. of pyridine and a small amount of sodium bicarbonate. Refluxing under nitrogen was continued for 8 hours until the reaction was completed. Aerial oxidation was carried out to convert the product to the anthraquinone. The resulting mixture was poured into 10% hydrochloric acid, yielding a gummy mass. This gummy mass was purified twice by precipitation from solution in acetone into dilute hydrochloric acid. The mass was further purified twice by precipitation of ethyl acetate solution into hexane and dried in a vacuum desiccator. The product showed the following spectral analysis in ethanol:

$\epsilon_{640\ m\mu} = 19,200$

The following example illustrates the usefulness of the novel compounds of this invention in color photography.

*Example 3*

A gelatin subcoated film support was first coated with an acetone-tetrahydrofuran coating solution (1:1 by volume) comprising 5.5% of 1 - (α - ethyl - β - hydroxyethylamino) - 4 - [β - (p - toluhydroquinonylthio) - α - methylethylamino] - anthraquinone and 2% cellulose acetate hydrogen phthalate. After this coating dried, a red-sensitive emulsion was applied. This film was exposed and an aqueous processing solution comprising:

| | Percent |
|---|---|
| Sodium hydroxide | 2.0 |
| 1-phenyl-3-pyrazolidone | 0.9 |
| 2,5-bis-ethyleneiminohydroquinone | 0.6 |
| Thioacetanilide | 0.4 | was spread between the photosensitive element and an image-receiving element having, as the image-receiving layer, a layer of N-methoxymethyl polyhexamethylene adipamide. After an imbibition time of 2 minutes, the image-receiving element was separated and a cyan image of good density was obtained.

The dye developers of this invention differ from other anthraquinone dye developers in the presence of the sulfur atom in the designated position. Prior to the present invention, it was not thought that such compounds would be operative in diffusion transfer processes such as described in Example 3.

It will be noted that to be useful in diffusion transfer photographic processes such as described in Example 3, the novel dyes of this invention should be alkali-soluble but water-insoluble, .ie., they should not contain any water-solubilizing groups. However, it is within the scope of this invention for the anthraquinone dye molecule to contain such solubilizing groups, in which case the resulting water-soluble dyes may be employed in photographic processes which do not involve diffusion transfer as well as in processes for dyeing fabrics and the like.

Since certain changes may be made in the above products and processes without departing from the scope of the invention herein involved, it is intended that all matter contained in the above description shall be interpreted as illustrative and not in a limiting sense.

What is claimed is:
1. A compound of the formula:

A—(NH—Z—S—X)$_m$ wherein A is an anthraquinone ring; X is a member of the group consisting of p-dihydroxyphenyl and p-dihydroxytolyl; Z is a member of the group consisting of alkylene of from 1 to 4 carbon atoms;

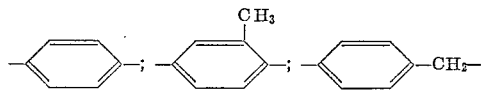

and

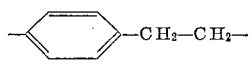

and *m* is a positive integer from 1 to 2, each of said —NH—Z—S—X substituents being bonded to an alpha carbon atom of said anthraquinone ring, provided that where *m* is 2, said substituents are substituted in the 1 and 4 positions of said anthraquinone ring; the remaining carbon atoms of said anthraquinone ring having bonded thereto a member of the group consisting of hydrogen, amino, alkyl, aryl, halogen, alkylamino, hydroxyalkylamino, aryloxy, alkoxy, hydroxyl, sulfonamido, alkylsulfonamido, arylsulfonamido, carboxamido, carboxyl and sulfo.

2. A compound as defined in claim 1 wherein *m* is 1, said —NH—Z—S—X substituent is substituted in the 4 position of said anthraquinone ring and the 1 position contains a substituent of the formula —NH—R wherein R is selected from the group consisting of alkyl and hydroxyalkyl in which the alkyl moiety contains less than 6 carbon atoms.

3. A compound as defined in claim 2 wherein R is hydroxy-sec-alkyl.

4. A compound of the formula:

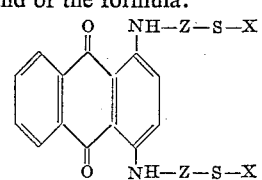

wherein each X is a member of the group consisting of p-dihydroxyphenyl and p-dihydroxytolyl; and each Z is selected from the group consisting of alkylene of from 1 to 4 carbon atoms;

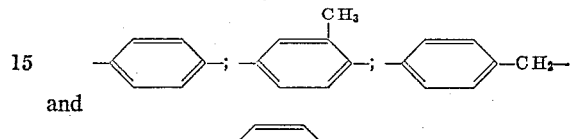

5. 1 - ($\alpha$ - ethyl - $\beta$ - hydroxyethylamino) - 4 - [$\beta$ - (p-toluhydroquinonylthio) - $\alpha$ - methylethylamino] - anthraquinone.

6. 1,4 - bis - [$\beta$ - (p - hydroquinonylthio) - $\alpha$ - methylethylamino] - anthraquinone.

References Cited by the Examiner
UNITED STATES PATENTS

| | | | |
|---|---|---|---|
| 2,372,663 | 4/1945 | Dickey et al. | 260—379 X |
| 2,727,045 | 12/1955 | McSheehy | 260—379 X |
| 3,009,958 | 11/1961 | Gree et al. | 260—479 X |

FOREIGN PATENTS 700,044  11/1953  Great Britain.

LORRAINE A. WEINBERGER, *Primary Examiner.*
DANIEL D. HORWITZ, *Examiner.*